Oct. 3, 1967  R. E. BRINER  3,344,875
SOIL SAMPLING DEVICE
Filed Feb. 23, 1965  3 Sheets-Sheet 1
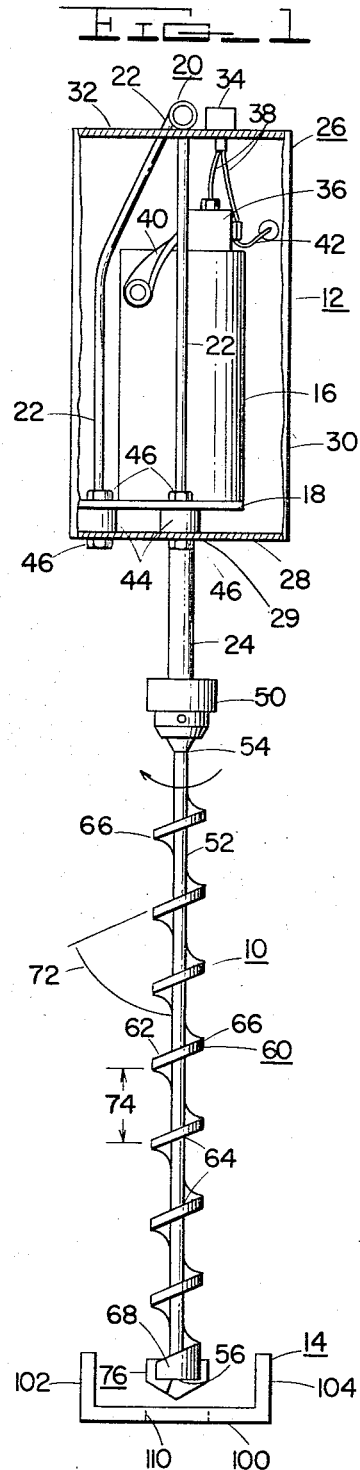
INVENTOR
ROSS E. BRINER
BY Wood, Guest & Irish
ATTORNEYS

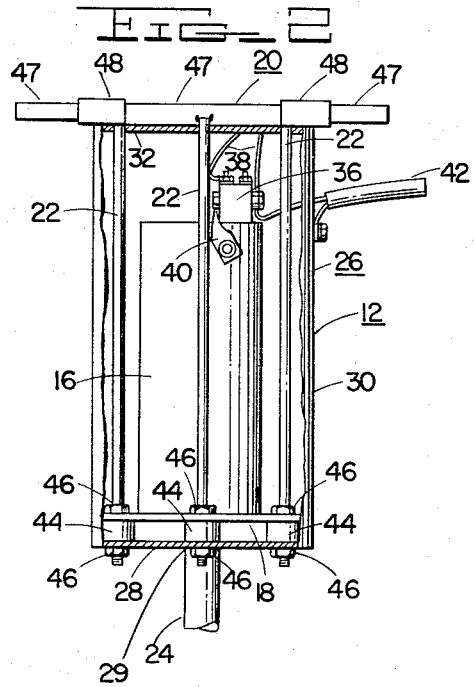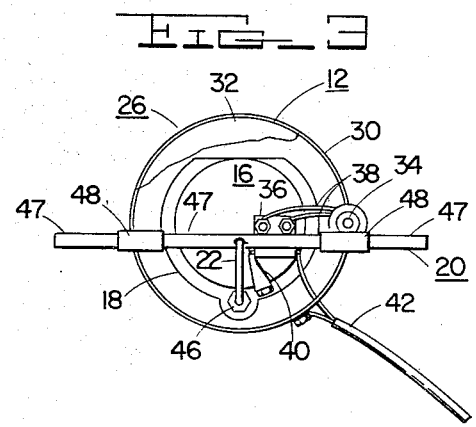

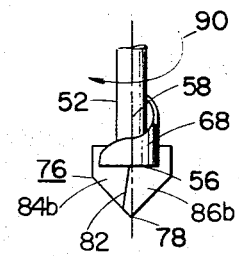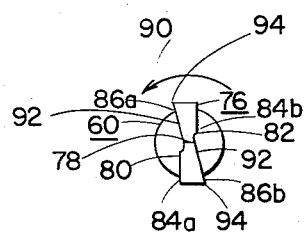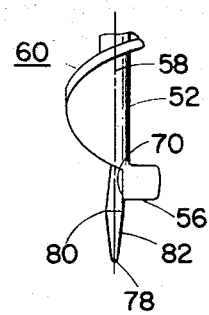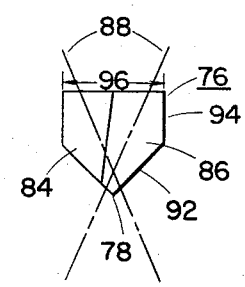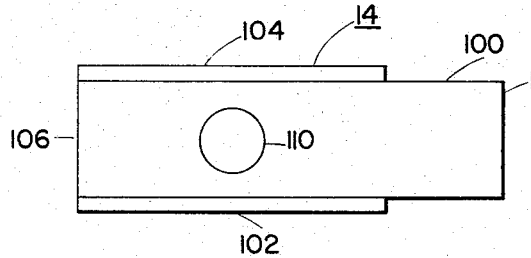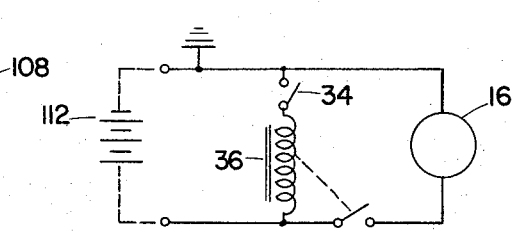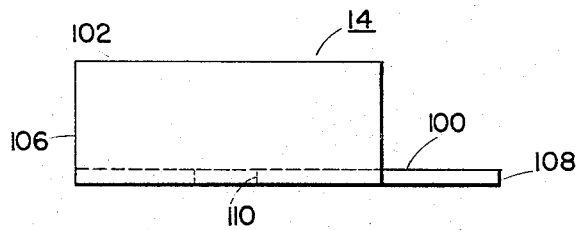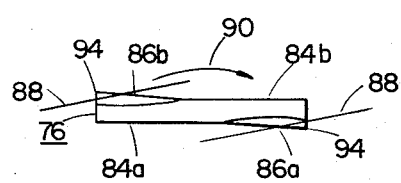

United States Patent Office 3,344,875
Patented Oct. 3, 1967

3,344,875
SOIL SAMPLING DEVICE
Ross E. Briner, R.R. 1, North Manchester, Ind. 46962
Filed Feb. 23, 1965, Ser. No. 434,558
15 Claims. (Cl. 175—170)

ABSTRACT OF THE DISCLOSURE

An apparatus for accurately and rapidly sampling soils without contamination. The apparatus utilizes a motor-driven drill and a box having a bottom and upstanding sides into which the soil sample is deposited. The drill has a continuous, helical earth elevator generally extending the entire length of the drill and a drill tip is secured at one end thereof. The drill tip has a dimension measured transversely of the drill axis larger than the corresponding dimension of the elevator whereby the elevator is spaced from the walls of a bore made by the drill tip. The preferred drill tip has a prismatic shape with an apex and two oppositely facing base surfaces. Each base surface has a flat surface portion and a curved surface portion. The flat surface portions are parallel and on opposite sides of the drill axis. The curved surface portions are also on opposite sides of the drill axis and are the leading surfaces of the drill tip when the drill is rotated.

---

The present invention relates to a soil sampling device, and more specifically, to a device for accurately removing a portion of the earth in a cylindrical sampling area without loss or contamination of the soil removed.

For some time it has been desirable to periodically sample the soil in agricultural areas to determine the deficiencies that a soil may have so that the soil may be properly replenished and maintained in a desirable condition that will allow crops to be repeatedly raised thereon successfully. Heretofore, soil sampling devices have been proposed and used. However, these devices must be used at times when the soil is not frozen, thereby forcing the farmer to have his soil sampled either before the soil becomes frozen in the fall, in the summer or in the spring after the ground becomes unfrozen. This defect in prior soil sampling devices results in a great number of soil samples being taken in the fall after the harvest of crops to determine the amount of fertilizer or the like required prior to planting in the spring. The procedure, however, overloads the existing soil sampling equipment and the laboratory facilities for analysis. For this reason, a great number of farmers have their soil samples taken in the spring and receive analysis thereon late in the spring after which time their crops should have been planted. Also, since the soil is desirably replenished before crops are planted, many farmers do not replenish their soil as would be desired if soil samples could be taken during the winter months and analyzed prior to the planting season. Additionally, samples taken during the fall during the short period that each farmer desirably would want his samples taken have to be expediently prepared and analyzed, and many errors are made and samples are lost. Some farmers in an attempt to anticipate the fall rush of soil sampling have their samples taken before a crop is harvested thereby resulting in an erroneous sample being analyzed and the soil being erroneously replenished. Further, prior soil sampling devices have not been successfully used to accurately sample loose and gravelly soils without difficulty and contamination. Still further, prior soil sampling devices have operated at relatively slow speeds thereby requiring a considerable time for taking a sample. It is therefore desirable to provide an improved soil sampling device which can be used to sample soil that is frozen, dried out or gravelly at a relatively fast speed and in a manner which insures accuracy and minimizes contamination.

It is accordingly an object of this invention to provide an improved soil sampling device that can accurately and rapidly sample soils that are frozen without contamination.

It is another object of this invention to provide an improved soil sampling device comprising a rotary drill with a helical lift that can accurately and rapidly sample all types of soils without contamination.

It is a further object of this invention to provide an improved rotary soil sampling device which can rapidly sample all types of soil in all climates accurately and without contamination.

It is still another object of this invention to provide a motorized soil sampling device which can be driven by any conventional power means, such as, for example, an electric motor powered by the 12-volt electrical system of a conventional motor vehicle.

It is a further object of this invention to provide an improved soil sampling device which is operable in any location, whether it be wilderness or urban.

It is still a further object of this invention to provide a motorized soil sampling device which is extremely portable and which can accurately sample soils of any type without contamination.

The above-mentioned and other features and objects of this invention and the manner of attaining them will become more apparent and the invention itself will be best understood by reference to the following description of an embodiment of the invention taken in conjunction with the accompanying drawings wherein:

FIG. 1 is a fragmentary side view, taken in one direction, of the soil sampling device of this invention including a power means, a bit, and a soil sampling box;

FIG. 2 is a fragmentary side view of the power means of the improved soil sampling device of this invention taken in a direction perpendicular to that direction viewed in FIG. 1;

FIG. 3 is a fragmentary top view of the soil sampling device of this invention as illustrated in FIG. 2;

FIG. 4 is an enlarged and fragmentary side view of the distal end of the bit of the improved soil sampling device of this invention from the direction viewed in FIG. 1;

FIG. 5 is a fragmentary and enlarged side view of the bit illustrated in FIG. 4 taken from a direction perpendicular to that viewed in FIGS. 1 and 4;

FIG. 6 is a bottom view of the bit of the improved sampling device of this invention as illustrated ni FIGS. 4 and 5;

FIG. 7 is an enlarged side view of the drill tip of this invention detached from the bit to which it is secured to as shown in FIGS. 1, 4, 5 and 6;

FIG. 8 is an enlarged top view of the drill tip of this invention detached from the bit as shown in FIG. 7;

FIG. 9 is a schematic diagram illustrating one means by which the soil sampling device of this invention can be powered;

FIG. 10 is a top view of the soil sampling box of this invention, illustrated in an end view in FIG. 1; and FIG. 11 is a side view of the soil sampling box of this invention as shown in FIGS. 1 and 10.

In the broader aspects of this invention there is provided an improved soil sampling device comprising a frame having a handle secured thereto and a motor mounted thereon, and having a drill shaft or bit operatively connected to the motor for rotation with a helical lift and a drill tip secured thereto. The helical lift is secured to the drill shaft intermediate the ends thereof and extends from a position adjacent to one end of the shaft to a position adjacent to the other end. The drill tip is secured to the distal end of the drill shaft and has a generally prismatic shape including an apex through which the shaft axis would pass if extended and two generally parallel base surfaces which face in opposite directions. Also provided is a soil sampling box having a bottom with a hole therein through which the bit can pass and opposite upstanding sides, an open top and open opposite ends.

Referring to the drawings, the improved soil sampling device of this invention is shown to generally comprise a bit 10 which is rotated by a power means 12, and which in combination with a soil sampling box 14 is useful to sample soils accurately and without contamination in a relative short time. Now referring specifically to FIGS. 1, 2 and 3, the power means 12 is shown to comprise a conventional motor 16 secured to a frame 18, by which the motor 16 is easily transportable. A handle 20 is secured to the frame 18 by means of three rods 22 which are secured to and depend from the handle 20 and surround the motor 16 on three sides thereof, the fourth side being open. The motor 16 has a shaft 24 depending therefrom which is rotatable by motor 16 in a clock-wise rotation, as indicated by arrow 90, whenever motor 16 is operated. Desirably and as shown, motor 16 is encased in a container 26 comprising a bottom 28 which is secured to frame 18 and has a central opening 29 therein through which shaft 24 passes, upstanding side walls 30, and a top 32. Handle 20, in addition to being secured to rods 22, is desirably secured to top 32 to provide additional rigidity and strength. As shown, handle 20 extends on both sides of container 26 outwardly and away from side walls 30 in opposite directions.

Preferably, the power means 12 is equipped with a switch 34 which is secured to top 32 adjacent handle 20 for selectively operating motor 16. The location of switch 34 for ease of operation should be such that it can be operated by a finger of a hand grasping handle 20. Switch 34 is operatively connected to a conventional relay 36 by means of relatively light conductors 38. Relay 36 is connected to motor 16 by a relatively heavy conductor 40 and also by a relatively heavy conductor 42 to the power source provided to drive the motor 16, diagrammatically illustrated to be battery 112 in FIG. 9.

In a preferred embodiment, the container 26 is cylindrical in shape and is made of suitably strong and durable metal joined together by conventional means such as by welding, brazing or similar means. Container 26 is desirably relatively tight thereby keeping dirt, snow and other foreign matter from the motor 16. Preferably, motor 16 is an electric motor which can be operated from a 12-volt electrical source such as that available in conventional motor vehicles; a conventional automobile starter motor and a modified automobile generator have proven to be satisfactory. Whenever an automobile starter motor or generator is used as motor 16, relay 36 can be conventional and of the type used in motor vehicle electrical systems. Frame 18 is desirably resiliently mounted to the bottom 28 of container 26 by means of resilient mounting blocks 44 and nuts 46 which are disposed on opposite sides of bottom 28.

Whenever the motor 16 is operated from a 12-volt source such as that of a conventional motor vehicle, the cable 42 extending between the power source 112 and the relay 36 and the cable 40 extending between the relay 36 and the motor 16 is desirably provided in size 0. Mounting blocks 44 can be made of any rubber like material which is relatively rigid; neoprene has proven to be satisfactory. Rods 22 and handle 20 can be made of any suitably strong metal. Handle 20 has satisfactorily been made of three lengths 47 of one inch steel pipe connected in end to end relationship by two pipe couplings, 48; and therefore, is illustrated in the drawings to be so constructed. When this construction of handle 20 is used, two of the rods 22 are secured to the pipe couplings 48 by welding or other like means to provide added strength as typically the couplings 48 have somewhat greater heft than the lengths of pipe 47.

Attached to the distal end of shaft 24 is a conventional drill chuck 50 for the attachment of soil sampling bit 10. In a specific embodiment, bit 10 can be secured directly to the shaft 24 by means of welding or a similar means, or integrally molded directly on the shaft 24 as a single piece; however, the provision of a drill chuck 50 is desirable, as chuck 50 allows the bit 10 to be removed for sharpening and replaced if broken and allows the power means 12 to be used for other purposes.

Now referring to FIGS. 1, 4, 5, 6, 7 and 8, the soil sampling bit 10 will be described. Bit 10 comprises a shaft 52 having opposite ends 54, 56 and a longitudinal axis 58. A helical earth elevator or lift 60 having a continuously extending surface 62 generally facing end 54 of shaft 52 is secured to shaft 52 intermediate the ends thereof and extends longitudinally of shaft 52 from a position adjacent to end 56 to a position adjacent to end 54. Lift 60 has an inner boundary 64 and an outer boundary 66 which define the opposite lateral boundaries of surface 62. Outer boundary 66 further generally defines the exterior diametral drill dimension intermediate the ends 54, 56 of shaft 52. Adjacent to end 56 earth elevator 60 terminates at an end portion 68 which has a flat surface 70 parallel to and spaced from axis 58. Helical lift 60 preferably has a dimension between boundaries 64, 66 which is three-quarters of the diameter of shaft 52, a pitch as indicated by angle 72 relative to the axis of shaft 52 of about sixty degrees, and undergoes one helix revolution for every distance 74, which, in the specific embodiment illustrated, is equal to one inch. Also in the embodiment illustrated, shaft 52 has a diameter of one-quarter inch, the distance between boundaries 64, 66 is three-sixteenths inch, and the drill dimension intermediate the ends 54, 56 of shaft 52 is five-eighths inch.

Now referring to FIGS. 1, 4, 5, 6, 7 and 8, there is illustrated a drill tip 76 having a generally prismatic shape with an apex 78 and two generally parallel base surfaces 80, 82 facing in opposite directions. Tip 76 is secured to shaft 52 with surface 82 adjacent to surface 70 of end portion 68 by means of welding, brazing or similar conventional means with axis 58, when extended, passing through apex 78. Each of the base surfaces 80, 82 have a flat surface portion 84 (given the sub-letters a, b to indicate the similar surface portions of the opposite base surfaces 80, 82, respectively) and a curved surface portion 86a and b, respectively (given the sub-letters a, b for the same reason). Flat surface portions 84a and b are parallel to each other and on opposite sides of axis 58. Curved surface portions 86a and b are also on opposite sides of axis 58, and further, are concavely curved about axes of curvature 88 which are inclined to axis 58 and which diverge in the direction of end 54 of shaft 52 from apex 78. Curved surfaces 86a and b are the leading surfaces and flat surfaces 84a and b are the trailing surfaces of drill tip 76 when the drill is rotated as indicated by arrow 90 and have sharpened leading edges at the boundaries 92, 94 thereof.

In a preferred embodiment, drill tip 76 has a dimension 96 of approximately three-quarters inch. When drill tip 76 is mounted on end portion 68 as above-described, edges 94 extend beyond the diametral dimension of the drill intermediate the ends 54, 56 as generally defined by the helical lift 60. In a specific embodiment of this invention, drill tip 76 is fabricated of carboloy material; however, any suitably tough, hard and durable material of like properties would be satisfactory.

Now referring to FIGS. 1, 10 and 11, there is shown a soil sampling box 14 comprising a bottom 100 of generally rectangular shape and two opposite and upstanding sides 102, 104. Sides 102, 104 are respectively secured to opposite longitudinal edges of bottom 100 and extend from one end 106 to a position intermediate end 106 and end 108 of bottom 100 and while illustrated to be generally rectangular, sides 102, 104 can be of any shape. Bottom 100 and sides 102, 104 define an open space therebetween having an open top and oppositely open ends. Bottom 100 intermediate sides 102, 104 has an opening 110 therein through which bit 10 can pass. Box 14 and bit 10 are used in combination to sample the soil accurately and without contamination as will be hereinafter described. While box can be made of any suitable rigid material, box 14 is preferably made of wood.

In operation, the soil sampling device of this invention is assembled as shown in FIG. 1 and connected to a power source as diagrammatically shown in FIG. 9 to be a 12-volt battery 112 of a conventional motor vehicle. With the motor 16 so connected, switch 34 can be operated to operate relay 36 to selectively operate the motor 16 and rotate the bit 10 when desired.

After the desired location where a soil sample is desirably taken is determined, the soil sampling box 14 is placed in that position on the ground with the hole 110 in registry therewith. The soil sampling drill of this invention is then held in a vertical position by means of handle 20, as illustrated in FIG. 1, and positioned so that the drill tip 76 is located in hole 110 of box 14. The switch 34 is then actuated thereby to actuate the motor 16 to rotate the bit 10. As soon as the bit 10 begins to rotate, the sampling of the soil located in a cylindrical space generally of the diameter of the hole 110 and extending beneath the hole 110 into the earth is begun. As the drill tip 76 bites into the ground, the soil is loosened by the bit and is fed upwardly by means of the curved surfaces 86a and b onto the helical lift 60. Helical lift 60 then carries the soil upwardly through the hole 110 and deposits the loose soil onto the bottom 100 of the box 14. Hole 110 desirably has a diameter slightly larger than the dimension 96 of the drill tip 76 thereby preventing any of the soil removed by the drill 10 from escaping from the box 14. The motor 16 is continuously operated until the bit 10 penetrates into the earth the desired depth and then the motor 16 is shut off by releasing the switch 34 and the bit 10 is carefully lifted from the hole 110 and the hole formed in the ground by the bit 10 and laid generally length-wise of the box 14 to insure that all of the earth remaining on the helical lift 60 is deposited in the box 14. The box 14 is then emptied into a sample container to be preserved for laboratory analysis.

By use of the improved soil sampling device of this invention in this manner, it has been found that soil samples can be taken accurately in a relatively short time without any likelihood that soil removed from the ground will be lost or contaminated. Further, as aforementioned, the soil sampling device of this invention can sample soils more rapidly than many prior proposed devices. This is made possible since the bit 10 can be rotated faster than prior rotary bits. With a specific embodiment of this invention, bit 10 can be rotated at a speed approaching 4000 r.p.m. and at that speed accurately sample soils without contamination.

It has further been determined that the specific shape of the drill tip 76 and the helical lift 60 is essential to this invention and are respectively required for the proper loosening of the soil and removal of the soil from the hole formed by the bit. Further, the helical lift 60 must have a surface sufficiently large to carry out the soil loosened by the drill tip 76 to prevent the soil from interfering with the operation of the tip 76, and a pitch 72 with respect to the axis 58 such that the soil will not be scattered out of the box 14 as soon as the soil emerges from hole 110 by the speed of the rotating bit 10 thereby causing a portion of the sample to be lost. Preferably, the lift 60 merely lifts the soil from the hole formed by the drill tip 76 and deposits the same into the box 14. When a drill tip was used which had an identical shape as drill tip 76 except that both base surfaces 80, 82 were flat, the drill tip was inoperative to the degree that the bit 10 could not successfully function at the relatively high speeds that are desired, and therefore, could not sample soils as rapidly as desired.

The soil sampling device of this invention will allow soil samples to be taken during any season including the months from November to March in which the soil sampling devices heretofore proposed have been inoperative due to frozen ground. Further, the soil sampling device of this invention will allow the sampling of loose and gravelly soils which has also plagued the devices of prior designs. While it has been disclosed that the soil sampling device of this invention can be powered by a 12-volt electrical system of a conventional motor vehicle, such as a truck, this provision is for convenience only and the soil sampling device of this invention could be, if desired, powered by a gasoline engine or other such means. However, it is desirable that the soil sampling device be portable and useful in places which do not have power sources readily available.

In the description above, the term "accuracy" is used to denote the removal of all of the soil previously positioned in the cylindrical hole made by the bit 10. Therefore, an accurate soil sample would contain all of the earth formerly in a cylindrical space extending from the surface of the earth downwardly to the desired depth. Further, the term "without contamination" is used to mean that the soil sample is taken without the addition of any foreign matter to the sample. The desirable sample is, in the terms of the words above defined, "accurate" and "without contamination"; and further, without loss of any of the material removed from the earth.

While there have been described above the principles of this invention in connection with specific apparatus, it is to be clearly understood that this description is made only by way of example and not as a limitation to the scope of this invention.

What is claimed is:

1. A soil sampling drill comprising a drill shaft having an axis and means at one end thereof for frictionally securing said shaft in a drill chuck, an earth elevator having a continuously extending helical surface generally facing said one end and extending longitudinally of said shaft from a position adjacent to said one end to a position adjacent to the opposite end of said shaft, said earth elevator having an inner and outer boundary and being coaxially secured to said shaft adjacent to said inner boundary, said surface extending laterally of said shaft between said boundaries, said outer boundary generally defining the exterior diametral drill dimension intermediate the ends of said shaft, said earth elevator having adjacent said other shaft end an end portion with a flat surface parallel to and spaced from said axis, and a drill tip having a generally prismatic shape including an apex and two generally parallel base surfaces which face in opposite directions, said tip being secured to said shaft with said flat surface adjacent to one of said base surfaces, said axis when extended passing through said apex, each of said base surfaces having a flat surface portion and a curved surface portion, said flat surface portions being parallel and on oppoiste sides of said axis, respectively, said curved surface portions being concavely curved about axes of curvature which are inclined to said axis and which diverge from said apex, said curved surface portions being on opposite sides of said axis, respectively, said curved surfaces being the leading surfaces of said drill tip when the drill is rotated and having sharpened leading edges at the boundaries thereof, the dimension of said drill tip measured laterally of said axis in one diametral direction being longer than said exterior drill dimension intermediate the ends of said shaft whereby said earth elevator is smaller than and spaced-apart from the walls of a bore made by said drill tip.

2. The drill of claim 1 wherein said earth elevator has a dimension between said boundaries which is three-quarters the diameter of said shaft, a pitch of about sixty degrees relative to said axis, and has one helix revolution every inch of said shaft, and wherein the diametral dimension of said drill tip is six-fifths of said exterior diametral drill dimension intermediate the ends of said shaft.

3. The drill of claim 1 wherein said earth elevator has a dimension between said boundaries of three-sixteenths inch, a pitch of about sixty degrees and has one spiral revolution for every inch of said shaft, wherein said shaft has a diameter of two-eighths inch, and wherein the diametral dimension of said drill tip is three-quarters inch and said exterior diametral drill dimension intermediate the ends of said shaft is five-eighths inch.

4. A soil sampling drill comprising a drill shaft having an axis and means at one end thereof for frictionally securing said shaft in a drill chuck, an earth elevator having a continuously extending helical surface generally facing said one end and extending longitudinally of said shaft from a position adjacent to said one end to a position adjacent to the opposite end of said shaft, said earth elevator having an inner and outer boundary and being coaxially secured to said shaft adjacent to said inner boundary, said surface extending laterally of said shaft between said boundaries, said outer boundary generally defining the exterior diametral drill dimension intermediate the ends of said shaft, said earth elevator having adjacent said other shaft end an end portion with a flat surface parallel to and spaced from said axis, and a drill tip having a generally prismatic shape including an apex and two generally parallel base surfaces which face in opposite directions, said tip being secured to said shaft with said flat surface adjacent one of said base surfaces, said axis when extended passing through said apex, the dimension of said drill tip measured laterally of said axis in one diametral direction being longer than said exterior drill dimension intermediate the ends of said shaft, each of said base surfaces having a concavely curved surface portion curved about an axis of curvature which is inclined to said axis and which together diverge from said apex, said curved surfaces being the leading surfaces of said drill tip when the drill is rotated.

5. A drill tip for a soil sampling device comprising a prismatic shaped piece having an apex and two generally parallel base surfaces which face in opposite directions, each of said base surfaces having a flat surface portion and a curved surface portion, said flat surface portions being parallel and, respectively, on opposite sides of the axis of revolution of the drill tip, said curved surface portions being concavely curved about axes of curvature which are inclined to the axis of revolution and which diverge from said apex, said curved surface portions, respectively, being on opposite sides of the axis of revolution and being the leading surfaces of the drill tip when rotated, said curved surface portions having sharpened leading edges at the boundaries thereof.

6. A drill tip for a soil sampling device comprising a prismatic shaped piece having an apex and two generally parallel base surfaces which face in opposite directions, each of said base surfaces having a concavely curved surface portion curved about an axis of curvature which is inclined to the axis of revolution of the drill tip and which diverge from said apex, said curved surfaces being the leading surfaces of the drill tip when rotated.

7. A soil sampling device comprising a box having a rectangular bottom and two opposite upstanding sides, said sides being fastened to said bottom at the longitudinal edges of said bottom and extending from one end of said bottom a partial length of said bottom, said sides defining an open space therebetween having an open top and oppositely disposed open ends, said bottom having an opening therein between said sides.

8. A soil sampling device comprising a container having a bottom with an opening therein, upstanding sides and a top, an electric motor mounted in said container, a handle secured to said container and extending on both sides of said container outwardly and beyond said container, a switch means secured to said container adjacent said handle for selectively operating said motor, a drill shaft having opposite ends and an axis, one end of said shaft operatively connected to said motor, said shaft depending from said motor and through said opening, an earth elevator having a continuously extending helical surface generally facing said one shaft end and extending longitudinally of said shaft from a position adjacent to said one shaft end to a position adjacent to the opposite shaft end, said earth elevator having an inner and outer boundary and being coaxially secured to said shaft adjacent to said inner boundary, said surface extending laterally of said shaft between said boundaries, said outer boundary generally defining the exterior diametral drill dimension intermediate the ends of said shaft, said earth elevator having adjacent said other shaft end an end portion with a flat surface parallel to and spaced from said axis, and a drill tip having a generally prismatic shape including an apex and two generally parallel base surfaces which face in opposite directions, said tip being secured to said shaft with said flat surface adjacent to one end of said base surfaces, said axis when extended passing through said apex, each of said base surfaces having a flat surface portion and a curved surface portion, said flat surface portions being parallel and on opposite sides of said axis, respectively, said curved surface portions being concavely curved about axes of curvature which are inclined to said axis and which diverge from said apex, said curved surface portions being on opposite sides of said axis, respectively, said curved surfaces being the leading surfaces of said drill tip when the drill is rotated and having sharpened leading edges at the boundaries thereof, the dimension of said drill tip measured laterally of said axis in one diametral direction being longer than said exterior drill dimension intermediate the ends of said shaft whereby said earth elevator is smaller than and spaced-apart from the walls of a bore made by said drill tip.

9. A soil sampling device comprising a frame, a motor mounted on said frame, a handle secured to said frame and extending beyond said frame on opposite sides thereof, a drill shaft having opposite ends and an axis, one end of said shaft operatively connected to said motor, an earth elevator having a continuously extending helical surface generally facing said one shaft end and extending longitudinally of said shaft from a position adjacent to said one end to a position adjacent to the opposite shaft end, said earth elevator having an inner and outer boundary and being coaxially secured to said shaft adjacent to said inner boundary, said surface extending laterally of said shaft between said boundaries, said outer boundary generally defining the exterior diametral drill dimension intermediate the ends of said shaft, said earth elevator having adjacent said other shaft end an end portion with a flat surface parallel to and spaced from said axis, and a drill tip having a generally prismatic shape including an apex and two generally parallel base surfaces which face in opposite directions, said tip being secured to said shaft with said flat surface adjacent to one of said base surfaces, said axis when extending passing through said apex, each of said base surfaces having a flat surface portion and a curved surface portion, said flat surface portions being parallel and on opposite sides of said axis, respectively, said curved surface portions being concavely curved about axes of curvature which are inclined to said axis and which diverge from said apex, said curved surface portions being on opposite sides of said axis, respectively, said curved surfaces being the leading surfaces of said drill tip when the drill is rotated and having sharpened leading edges at the boundaries thereof, the dimension of said drill tip measured laterally of said axis in one diametral direction being longer than said exterior drill dimension intermediate the ends of said shaft whereby said earth elevator is smaller than and spaced-apart from the walls of a bore made by said drill tip.

10. A soil sampling device comprising a frame, a motor mounted on said frame, a handle secured to said frame and extending beyond said frame on opposite sides thereof, a drill shaft having opposite ends and an axis, one end of said shaft operatively connected to said motor, an earth elevator having a continuously extending helical surface generally facing said one shaft end and extending longitudinally of said shaft from a position adjacent to said one end to a position adjacent to the opposite shaft end, said earth elevator having an inner and outer boundary and being coaxially secured to said shaft adjacent to said inner boundary, said surface extending laterally of said shaft between said boundaries, said outer boundary generally defining the exterior diametral drill dimension intermediate the ends of said shaft, said earth elevator having adjacent said other shaft end an end portion with a flat surface parallel to and spaced from said axis, and a drill tip having a generally prismatic shape including an apex and two generally parallel base surfaces which face in opposite directions, said tip being secured to said shaft with said flat surface adjacent to one of said base surfaces, said axis when extended passing through said apex, the dimension of said drill tip measured laterally of said axis in one diametral direction being longer than said exterior drill dimension intermediate the ends of said shaft, each of said base surfaces having a concavely curved surface portion curved about an axis of curvature which is inclined to said axis and which together diverge from said apex, said curved surfaces being the leading surfaces of said drill tip when the drill is rotated.

11. A soil sampling device comprising a frame, a motor mounted on said frame, a handle secured to said frame and extending beyond said frame on opposite sides thereof, a drill shaft having opposite ends and an axis, one end of said shaft operatively connected to said motor, an earth elevator having a continuously extending helical surface generally facing said one shaft end and extending longitudinally of said shaft from a position adjacent to said one end to a position adjacent to the opposite shaft end, said earth elevator having an inner and outer boundary and being coaxially secured to said shaft adjacent to said inner boundary, said surface extending laterally of said shaft between said boundaries, said outer boundary generally defining the exterior diametral drill dimension intermediate the ends of said shaft, said earth elevator having adjacent said other shaft end an end portion with a flat surface parallel to and spaced from said axis, a drill tip having a generally prismatic shape including an apex and two generally parallel base surfaces which face in opposite directions, said tip being secured to said shaft with said flat surface adjacent to one of said base surfaces, said axis when extended passing through said apex, each of said base surfaces having a concavely curved surface portion curved about an axis of curvature which is inclined to said axis and which diverge from said apex, said curved surfaces being the leading surfaces of said drill tip when the drill is rotated, a box having a rectangular bottom and two opposite upstanding sides, said sides being fastened to said bottom at the longitudinal edges of said bottom and extending from one end of said bottom a partial length of said bottom, said sides defining an open space therebetween having an open top and oppositely disposed open ends, said bottom having an opening therein between said sides through which said earth elevator and drill shaft can pass.

12. A soil sampling device comprising a frame, a motor mounted on said frame, a handle secured to said frame and extending beyond said frame on opposite sides thereof, a drill shaft having opposite ends and an axis, one end of said shaft operatively connected to said motor, an earth elevator having a continuously extending helical surface generally facing said one shaft end and extending longitudinally of said shaft from a position adjacent to said one end to a position adjacent to the opposite shaft end, said earth elevator having an inner and outer boundary and being coaxially secured to said shaft adjacent to said inner boundary, said surface extending laterally of said shaft between said boundaries, said outer boundary generally defining the exterior diametral drill dimension intermediate the ends of said shaft, said earth elevator having adjacent said other shaft end an end portion with a flat surface parallel to and spaced from said axis, a drill tip having a generally prismatic shape including an apex and two generally parallel base surfaces which face in opposite directions, said tip being secured to said shaft with said flat surface adjacent to one of said base surfaces, said axis when extended passing through said apex, each of said base surfaces having a flat surface portion and a curved surface portion, said flat surface portions being parallel and on opposite sides of said axis, respectively, said curved surface portions being concavely curved about axes of curvature which are inclined to said axis and which diverge from said apex, said curved surface portions being on opposite sides of said axis, respectively, said curved surfaces being the leading surfaces of said drill tip when the drill is rotated and having sharpened leading edges at the boundaries thereof, the dimension of said drill tip measured laterally of said axis in one diametral direction being longer than said exterior drill dimension intermediate the ends of said shaft, and a box having a rectangular bottom and two opposite upstanding sides, said sides being fastened to said bottom at the longitudinal edges of said bottom and extending from one end of said bottom a partial length of said bottom, said sides defining an open space therebetween having an open top and oppositely disposed open ends, said bottom having an opening therein between said sides through which said earth elevator and drill shaft can pass.

13. A soil sampling drill comprising a drill shaft having an axis and means at one end thereof for frictionally securing said shaft in a drill chuck, an earth elevator having a continuously extending helical surface generally facing said one end and extending longitudinally of said shaft from a position adjacent to said one end to a position adjacent to the opposite end of said shaft, said earth elevator having an inner and outer boundary and being coaxially secured to said shaft adjacent to said inner boundary, said surface extending laterally of said shaft between said boundaries, said outer boundary generally defining the exterior diametral drill dimension intermediate the ends of said shaft, said earth elevator having an end portion adjacent to said other shaft end, and a drill tip having a generally prismatic shape including an apex and two generally parallel base surfaces which face in opposite directions, said tip being secured to said end portion of said shaft, said axis when extended passing through said apex, the dimension of said drill tip measured laterally of said axis in one diametral direction being longer than said exterior drill dimension intermediate the ends of said shaft, each of said base surfaces having a concavely curved surface portion curved about an axis of curvature which is inclined to said axis and which together diverge from said apex, said curved surfaces being the leading surfaces of said drill tip when the drill is rotated.

14. A soil sampling device comprising a frame, a motor mounted on said frame, a handle secured to said frame, a drill shaft having opposite ends and an axis, one end of said shaft operatively connected to said motor, an earth elevator having a continuously extending helical surface generally facing said one shaft end and extending longitudinally of said shaft from a position adjacent to said one end to a position adjacent to the opposite shaft end, said earth elevator having an inner and outer boundary and being coaxially secured to said shaft adjacent to said inner boundary, said surface extending laterally of said shaft between said boundaries, said outer boundary generally defining the exterior diametral drill dimension intermediate the ends of said shaft, said earth elevator having adjacent said other shaft end an end portion, and a drill tip having a generally prismatic shape including an apex and two generally parallel base surfaces which face in opposite directions, said tip being secured to said end portion of said shaft, said axis when extended passing through said apex, the dimension of said drill tip measured laterally of said axis in one diametral direction being longer than said exterior drill dimension intermediate the ends of said shaft, each of said base surfaces having a concavely curved surface portion curved about an axis of curvature which is inclined to said axis and which diverge from said apex, said curved surfaces being the leading surfaces of said drill tip when the drill is rotated.

15. A soil sampling device comprising a frame, a motor mounted on said frame, a handle secured to said frame, a drill shaft having opposite ends and an axis, one end of said shaft operatively connected to said motor, an earth elevator having a continuously extending helical surface generally facing said one shaft end and extending longitudinally of said shaft from a position adjacent to said one end to a position adjacent to the opposite shaft end, said earth elevator having an inner and outer boundary and being coaxially secured to said shaft adjacent to said inner boundary, said surface extending laterally of said shaft between said boundaries, said outer boundary generally defining the exterior diametral drill dimension intermediate the ends of said shaft, said earth elevator having adjacent to said other shaft end an end portion, a drill tip having a generally prismatic shape including an apex and two generally parallel base surfaces which face in opposite directions, said tip being secured to said end portion of said shaft, said axis when extended passing through said apex, each of said base surfaces having a flat surface portion and a curved surface portion, said flat surface portions being parallel and on opposite sides of said axis, respectively, said curved surface portions being concavely curved about axes of curvature which are inclined to said axis and which diverge from said apex, said curved surface portions being on opposite sides of said axis, respectively, said curved surfaces being the leading surfaces of said drill tip when the drill is rotated and having sharpened leading edges at the boundaries thereof, the dimension of said drill tip measured laterally of said axis in one diametral direction being longer than said exterior drill dimension intermediate the ends of said shaft, and a box having a bottom and two opposite upstanding sides, said sides defining an open space therebetween, said bottom having an opening therein between said sides through which said earth elevator and drill shaft can pass.

References Cited
UNITED STATES PATENTS

| | | | |
|---|---|---|---|
| 27,268 | 2/1860 | Butler | 175—394 X |
| 772,043 | 10/1904 | Kleinschmidt | 175—394 X |
| 779,968 | 1/1905 | Robertson | 175—327 X |
| 2,635,856 | 4/1953 | Scheffer | 175—394 |
| 2,746,720 | 6/1956 | Cannon | 175—394 X |
| 2,883,155 | 4/1959 | Geherke | 175—210 X |
| 2,902,260 | 9/1959 | Tilden | 175—394 |
| 3,025,917 | 3/1962 | Knoblauch | 175—18 |
| 3,198,266 | 8/1965 | Mishler | 175—18 |

CHARLES E. O'CONNELL, *Primary Examiner.*

R. E. FAVREAU, *Examiner.*